United States Patent [19]

Faroudja

[11] Patent Number: 5,081,521
[45] Date of Patent: Jan. 14, 1992

[54] NTSC COLOR TELEVISION SYSTEM WITH IMPROVED CHROMA BANDWIDTH AND CHROMA RINGING REDUCTION

[76] Inventor: Yves C. Faroudja, 26595 Anacapa Dr., Los Altos Hills, Calif. 94022

[21] Appl. No.: 509,314

[22] Filed: Apr. 13, 1990

[51] Int. Cl.$^5$ .................... H04N 11/18; H04N 11/14; H04N 11/00
[52] U.S. Cl. ...................................... 358/14; 358/12; 358/16
[58] Field of Search ........................ 358/12, 14, 15, 16

[56] References Cited

U.S. PATENT DOCUMENTS 4,641,179 2/1987 LoCrcpvo et al. ................... 358/12

FOREIGN PATENT DOCUMENTS

217789 9/1987 Japan .
1-101093 4/1989 Japan .
1-253387 10/1989 Japan .

Primary Examiner—John W. Shepperd
Attorney, Agent, or Firm—David B. Harrison

[57] ABSTRACT

A chroma modulation method for extending the bandwidth of baseband plural chroma components of an NTSC format quadrature modulated chroma subcarrier color television signal, such as I and Q components, with reduced susceptibility to ringing and with compatibility with existing NTSC color television receivers comprises the steps of: separating the baseband I and Q components into narrow bandwidth segments and extended bandwidth portions not including the narrow bandwidth segments; q u a d r a t u r e modulating the narrow bandwidth segments into a narrow band double sideband quadrature modulation envelope about the subcarrier frequency; alternately selecting and putting out the extended bandwidth portions of the I and Q components on a basis related to a predetermined scanning period of the television signal, such as the field period; modulating the alternately selected extended bandwidth portions at the subcarrier frequency to produce a lower single sideband; and, combining in corrected time relationship the double sideband quadrature modulation envelope and the lower single sideband of the extended bandwidth portion modulation envelope to provide chroma modulation having an extended bandwidth. A compatible demodulation method is also described.

12 Claims, 4 Drawing Sheets

NTSC COLOR TELEVISION SYSTEM WITH IMPROVED CHROMA BANDWIDTH AND CHROMA RINGING REDUCTION

FIELD OF THE INVENTION

The present invention relates to color television signal processing methods and equipment. More particularly, the present invention relates to an NTSC signal format color television system manifesting improved chroma bandwidth and concomitant reduction of ringing caused by passage through a transmission path.

BACKGROUND OF THE INVENTION

One characteristic drawback of NTSC signal format modulation schemes is that only one of the color components is subjected to vestigial sideband filtering. The I color component is accorded a bandwidth of 1.2 MHz, while the Q o color component is accorded a 0.6 MHz bandwidth. The reason for this characteristic is that it is necessary in order to separate the I and Q color components. This is accomplished by looking for the I component in the bandwidth beyond 0.6 MHz, for example. (In order to know the angle of a vector, there must be two vectors. Two distinguishable sidebands provide the two vectors and consequently the angle between them.)

Thus, quadrature modulation schemes, except those that are performing line averaging, such as the phase alternation line (PAL) scheme, are condemned to use two sidebands for the color subcarrier. And, if a vestigial sideband system is being used, as with the NTSC color signal format, vestigial sideband filtering may be performed only upon one of the two sidebands; otherwise there is no mechanism for separating the sidebands or recognizing which one is e.g. The I component and which one is e.g. The Q component.

While the disparity in bandwidth between the I and Q components is a fundamental weakness of the NTSC color signal format, a number of processes have been available to attempt to correct for this weakness. For example, chroma bandwidth expansion techniques may be employed in an attempt to restore missing bandwidth to the chroma (and sharpness to the chroma component of the picture display). While chroma bandwidth expansion is a relatively straightforward technique, there is another, and much more difficult drawback with NTSC color television signals which have been subjected to filtering at the transmission end of the path.

These filters have very sharp skirts in order to limit the effective picture energy radiated from the transmitting antenna to the allotted channel bandwidth (typically 6 MHz in the United States). These filters are consequently sometimes referred to as "brick wall" filters, and they are most effectively present at 4.2 MHz above the assigned picture carrier frequency (in order to make spectral room for the 4.5 MHz FM modulated sound carrier). Brick wall filters of the type employed in television transmission paths have the drawback of group delay errors which are most pronounced in the 3.8 MHz to 4.2 MHz range.

Group delay errors of these brick wall filters have a very severe and adverse impact upon the I and Q quadrature modulation scheme, centered at 3.579545 MHz. This impact is excessive chroma ringing in the chroma signal recovered at the receiver/display.

Thus, the compromise reached by the National Television Standards Committee (NTSC) in establishing the I lower sideband bandwidth at 1.2 MHz, and the Q upper and lower sideband bandwidth at 0.6 MHz has resulted in serious weaknesses in the NTSC signal format: after the transmission process, there is a loss of resolution (which can be overcome somewhat by chroma crispening techniques at the receiver/display), and ringing of chrominance transitions. This ringing is most difficult to reduce or eliminate at the receiver/display.

Thus, since the inception and adoption of the NTSC color signal format, there has been a need for a mechanism for distinguishing between the I and Q color component high frequencies which does not limit the Q color component to a 0.6 MHz bandwidth only.

There is also a need to reduce chrominance ringing due to brick wall filtering in the composite video path.

In the PAL color signal format, two equal color components have bandwidths of 1.5 MHz, and the components are inverted in phase from line to line. When two lines are combined without phase delay, the U color component is recovered. When the two lines are combined with a 180° phase delay, the V color component is recovered. The PAL system works very well and provides greater overall color bandwidth than has heretofore been provided with the NTSC color signal format. In the SECAM color format, line sequential schemes are used, also with greater success than has heretofore been achieved with the NTSC color signal format.

While many formats and schemes may be imagined which result in improved overall chroma bandwidth and which present reduced ringing following the transmission path, a primary consideration is that the new scheme must be downwardly compatible with existing vestigial sideband filters and with existing receiver/display devices without objectionable impairment.

Thus, a hitherto unsolved need has arisen for a modified NTSC color signal format which effectively increases the overall chroma bandwidth while at the same time results in significantly reduced chroma ringing.

SUMMARY OF THE INVENTION WITH OBJECTS

A general object of the present invention is to provide an NTSC compatible signal format color television system which manifests improved chroma bandwidth at the receiver/display device and also manifests concomitant reduction of chroma ringing in the picture display otherwise caused by passage through a transmission path, in a manner which overcomes the limitations and drawbacks of the prior art.

Another object of the present invention is to provide a modified NTSC color format television system which maintains undegraded compatibility with existing television transmitters and receivers/displays, and which manifests vastly improved chroma picture quality upon improved displays which make full use of the modified NTSC format.

One more object of the present invention is to provide a television scan-period-sequential alternation system for alternating the color components, such as I and Q or (R-Y) and (B-Y) in accordance with a scan period, such as line, field or frame, so that both components may be presented to the receiver/display alternately with full chroma bandwidth.

Yet one more object of the present invention is to increase the effective bandwidth of all of the composite chroma information to 1.5 MHz instead of 1.2 MHz for the I component and 0.6 MHz for the Q component as it is conventionally transmitted.

In accordance with the principles of the present invention, a chroma modulation method is provided for extending the bandwidth of baseband I and Q chroma components of an NTSC format quadrature modulated chroma subcarrier color television signal as demodulated in an improved chroma demodulating method with reduced susceptibility to ringing comprising at a chroma modulator and with compatibility with existing NTSC color television receivers. The chroma modulation method comprises the steps of:

separating the baseband I and Q components into narrow bandwidth segments and extended bandwidth portions not including the narrow bandwidth segments, quadrature modulating the narrow bandwidth segments into a narrow band double sideband quadrature modulation envelope about the subcarrier frequency, alternately selecting and putting out the extended bandwidth portions of the I and Q components on a basis related to a predetermined scanning period of the television signal, modulating the alternately selected extended bandwidth portions at the subcarrier frequency to produce a lower single sideband, and combining in corrected time relationship the double sideband quadrature modulation envelope and the lower single sideband of the extended bandwidth portion modulation envelope to provide chroma modulation having an extended bandwidth.

In one aspect of the present invention, the step of modulating the alternately selected extended bandwidth portions to produce a lower single sideband includes the step of low pass filtering the upper sideband to limit it to an upper frequency not substantially greater than the upper frequency limit of the double sideband quadrature modulation envelope.

In one more aspect of the invention, the double sideband quadrature modulation envelope is limited to approximately plus and minus 400 kilohertz about the chroma subcarrier, and wherein the low pass filtered extended bandwidth portion modulation envelope extends from approximately minus 400 kilohertz to minus 1500 kilhertz below the the chroma subcarrier.

In a further aspect of the invention, the predetermined scanning period of the television signal is selected to be the field period.

In furtherance of the method of the present invention the improved chroma demodulating method for demodulating the chroma modulation comprises at a display the steps of:

separating the chroma modulation passband from a received composite video signal, quadrature demodulating the separated chroma modulation passband into a received I component and a received Q component, low pass filtering the received I component into a narrow bandwidth I segment, low pass filtering the received Q component into a narrow bandwidth Q segment, bandpass filtering the received I component into an extended bandwidth I portion, bandpass filtering the received Q component into an extended bandwidth Q portion, alternately selecting and putting out the extended bandwidth I portion and the extended bandwidth Q portion on the said basis related to a predetermined scanning period of the television signal to provide a selected portion, passing the selected portions through a delay corresponding in period to the predetermined scanning period to provide a delayed portion, combining the selected portion and the delayed portion in a decoder means to recover for each predetermined scanning period an extended bandwidth I portion and an extended bandwidth Q portion, adding in proper time relationship the narrow bandwidth I segment and the extended bandwidth I portion to provide a received full bandwidth I component, adding in proper time relationship the narrow bandwidth Q segment and the extended bandwidth Q portion to provide a received full bandwidth Q component, and decoding the extended bandwidth I component and the extended bandwidth Q component with the received luminance into red, green and blue video signals for presentation on a display screen of the display.

While reference is made to the I and Q chroma components, it will be appreciated by those skilled in the art that the principles of the present invention work equally successfully with red minus luminance (R-Y) and blue minus luminance (B-Y) color components.

These and other objects, aspects, features and advantages will be more fully understood and appreciated upon consideration of the following description of a preferred embodiment, presented in conjunction with the accompanying drawings.

DETAILED DESCRIPTION OF A PREFERRED EMBODIMENT

Figure 1A:
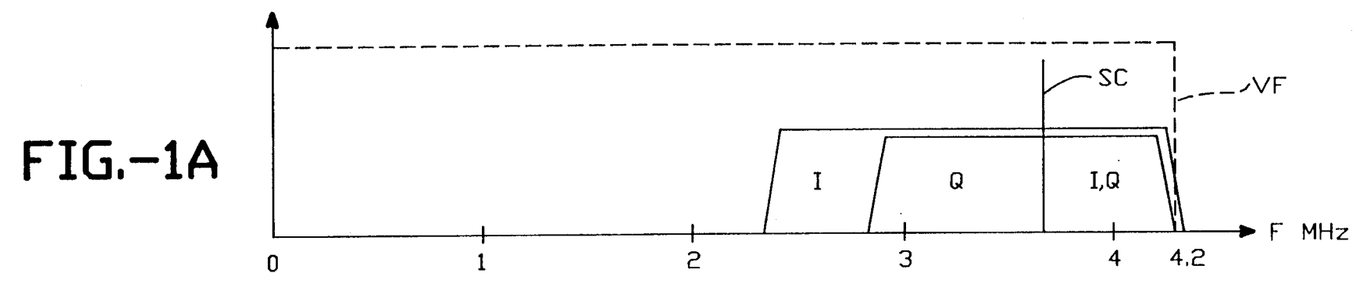
FIGS. 1A-1C are a series of graphs drawn along a common frequency baseline respectively illustrating the conventional NTSC baseband signal spectrum, and two graphs illustrating respectively a first scan period baseband spectrum showing an expanded bandwidth I color component, and a second scan period baseband spectrum showing an expanded bandwidth Q color component.

FIG. 1A illustrates the conventional NTSC signal format as transmitted within an alotted channel. The I and Q color components are quadrature modulated about a suppressed color subcarrier SC at an odd multiple of one half of the line scan rate (e.g. 3.579545 MHz). In order to be sure that the picture information will not pollute the frequency modulated sound carrier at 4.5 MHz, a vestigial filter VF is used. The vestigial filter characteristic, shown in FIG. 1 lops off the upper sideband of the I component at 0.6 MHz above the color subcarrier SC. This brick wall filter characteristic causes ringing in the color display at a receiver, most noticeable to the viewer when a color bar test pattern is transmitted from the transmitter, but often otherwise visible in the reproduced picture image of real pictures, particularly when color saturation is high.

Figure 1B:
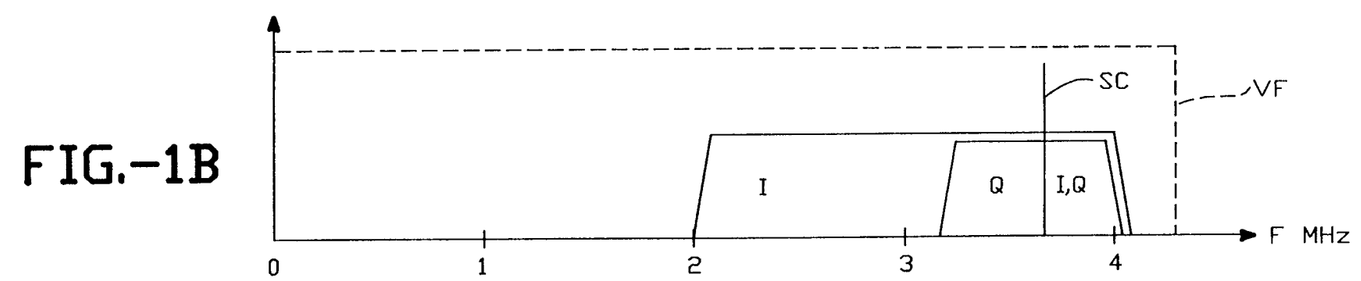
Figure 1C:
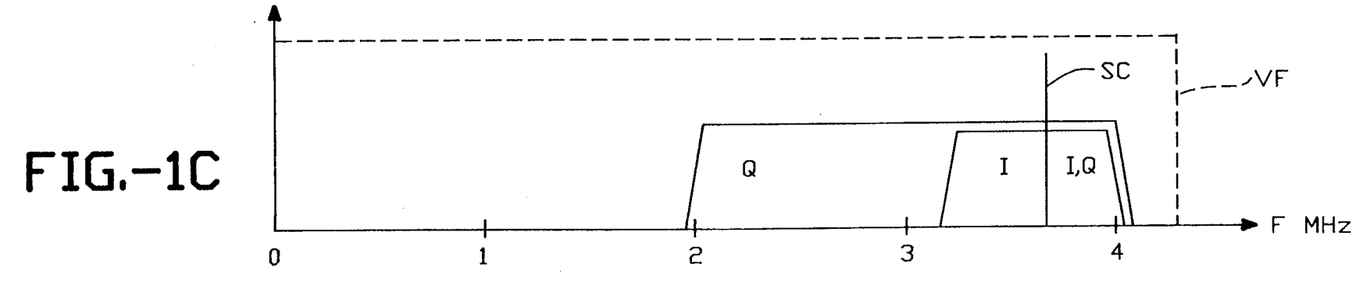

FIGS. 1B and 1C illustrate two scan period sequential baseband color spectra. FIG. 1B shows a compatible modification of the NTSC color format which increases the I color component lower sideband bandwidth to 1.5 MHz below the color subcarrier SC, and reduces the Q color component bandwidth to ±0.4 MHz relative to the color subcarrier SC. This modification will provide conventional receivers with overall increased chroma sharpness and with reduced ringing.

FIG. 1C shows a non-compatible modification of the NTSC color format which establishes a Q color component lower sideband bandwidth of 1.5 MHz and which reduces the I color component bandwidth to ±0.4 MHz. The signal spectra of FIGS. 1B and 1C alternate in accordance with a predetermined scan period of the television signal format: either line by line, line group by line group, field by field, or frame by frame.

With this slightly modified signal format for the NTSC color signal, one not only obtains a full bandwidth for the Q component (on a sequential basis) but also increases the spectral separation between the I and Q components (1.5 MHz to 0.4 MHz as compared with 1.2 MHz for I and 0.6 MHz for Q in the conventional NTSC standard). The resultant signal is essentially NTSC; however, an improved receiver/display capable of discriminating between the scan periods will manifest full bandwidth for both the I and Q components. Also, by limiting the upper sideband bandwidth to 0.4 MHz above the suppressed color subcarrier, the highest frequency modulation components of color information are kept about 200 kilohertz away from the characteristic of the brick wall vestigial sideband filter which is most apt to result in ringing of the color information at the picture display following the transmission path. This reduction to 400 kilohertz of the upper sidebands of chrominance information is useful in that the lower sideband now carries the high frequency information previously carried by the upper sideband for the Q component. Thus, the upper sideband components are moved effectively away from the brick wall filter with a consequent reduction in chroma ringing at the display following transmission.

The next issue is whether to alternate on a line by line basis; or on a line pair or group by line pair or group basis; or on a field by field basis; or on a frame by frame basis.

If the switch is made on a line by line basis, the implementation is the simplest and imposes the lowest cost. Such an approach has been proven feasible and reliable in the PAL and SECAM schemes. However, a major drawback lies with signal processing systems employing comb filter chromaluminance separators at the encoder or decoder. Those filters will have the effect of averaging the I and Q full bandwidth components that have been so carefully separated.

The line pair by line pair basis will work, but the result is coarse, in the sense that the resultant picture display may not be visually pleasing in the downwardly compatible display mode. (This display is somewhat akin to a chroma sawtooth in a chroma test signal such as color bars). Also, this scheme is incompatible with bidimensional signal processing schemes which require that each line of the field be identical.

The frame by frame pair basis is also practical with three inconveniences: First, the cost of frame memory is the highest cost of the storage devices required for any scan period implementation. Second, one cannot use frame memory for encoding and decoding, as the I and Q information will be mixed or averaged together as was the drawback with comb filter processing of the line by line color component alternation scheme. Third, there will be perceptible chroma flicker at a 15 Hz rate which is sufficiently slow to be perceived by the viewer. This flicker will be most noticeable in the display of a transmitted color bar test pattern at the green-magenta transition. It may also be visible in reality-based color pictures having high color saturation levels, such as 40%. (Most color saturation levels of reality-based color pictures are not significantly greater than 20%). The liklihood of annoying flicker is also increased with computer generated animation and cartoons which put out color saturation levels as high as 100%, but these pictures should be prefiltered to reduce color saturation to acceptable levels for transmission (interleave with high frequency luminance) in accordance with standard broadcast good practice.

The field by field basis is the most acceptable scan period for alternating the I and Q color components in accordance with the principles of this invention, and field by field alternation is presently most preferred. First, field storage memory costs about half the cost of frame memory. Second, while there may be a flicker at the green-magenta border of a transmitted color bar test pattern, the alternation (flicker) rate is 30 Hz, instead of 15 Hz, and this rate is above the level of perception by most viewers. Third, any form of conventional comb filtering may be used, whether the combing occurs in the temporal domain on a frame period by frame period basis, or whether it occurs in the spatial domain on a scan line period by scan line period basis. Also, comb filtering on a field period basis is not an efficient or frequently encountered process, because it has none of the advantages of frame period comb filtering in terms of preserving the resolution purity of diagonal transitions.

Figure 2:
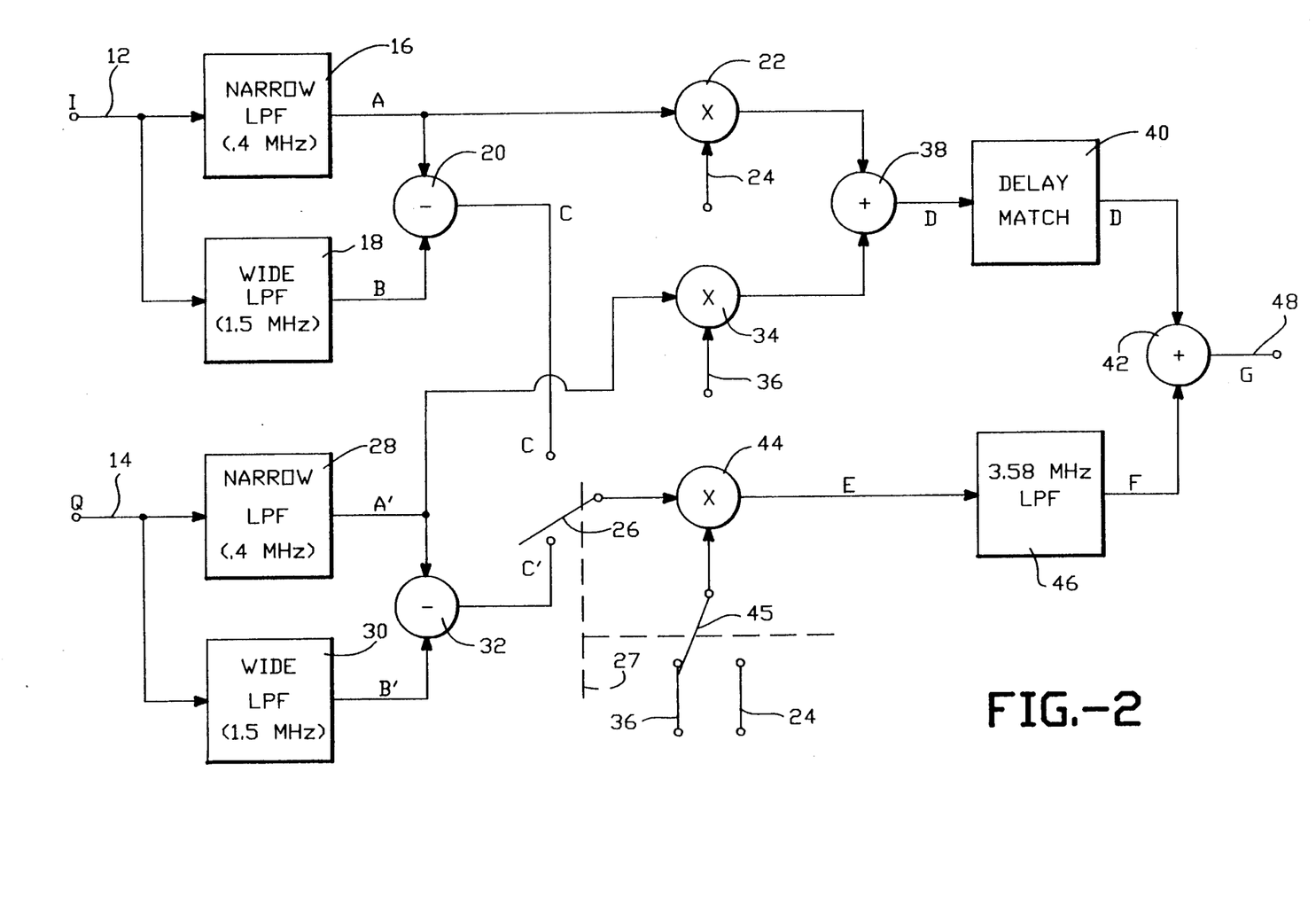
FIG. 2 is a block diagram of a chroma modulator implementing the principles of the present invention.

Turning now to FIG. 2, a chroma modulator 10 implements the principles of the present invention. The modulator 10 includes an I color component input 12 and a Q color component input 14 (While I and Q conventions are used herein, it is also to be understood that red minus luminance (R-Y) and blue minus luminance (B-Y) components may be used with equal success). The I component input 12 leads to two low pass filters: a noarrow low pass filter 16 having a cutoff at 400 kilohertz, and a wide low pass filter 18 having a cutoff at 1.5 megahertz. A narrow bandwidth output A from the filter 16 leads to a subtractor 20 and also to a port of a zero phase shift quadrature modulator 22 which also receives the subcarrier signal SC with zero phase shift on a line 24.

Figure 4A:
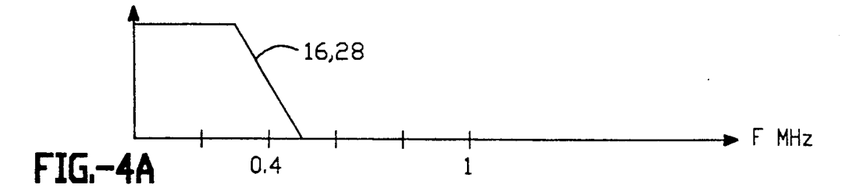
FIGS. 4A-4G are a series of baseband spectral graphs drawn along a common frequency baseline illustrating operation of various components of the FIG. 3 chroma demodulator.
Figure 4B:
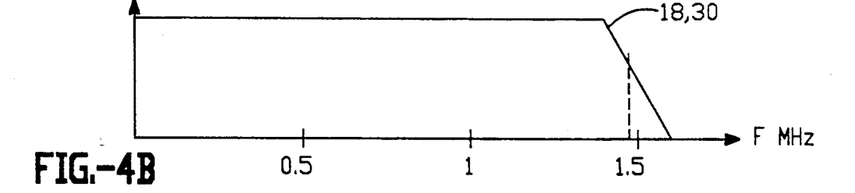
Figure 4C:
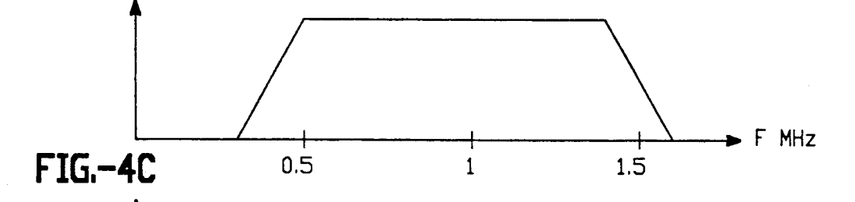

A wide bandwidth output B from the wide low pass filter 18 also leads to the subtractor 20. The subtractor 20 subtracts the narrow bandwidth output A from the wide bandwidth output B, leaving an upper spectrum (0.4 to 1.5 MHz) bandwidth C of the I component. The operation of the filters 16 and 18, and the subtractor 20 is graphed in FIGS. 4A, 4B, and 4C. The upper spectrum output C leads to one pole of a two-pole switch 26 which preferably operates on a field by field basis.

The Q component input 14 leads to two filters 28 and 30. The filter 28 is a narrow bandwidth low pass filter also having a bandpass of 400 kilohertz. The filter 30 is a wide bandwidth low pass filter having a bandpass of 1.5 megahertz. The narrow bandwidth output A' from the filter 28 is subtracted from the wide bandwidth output B' from the filter 30 to yield an upper spectrum signal C' of the Q color component. The upper spectrum signal C' leads to the other pole of the two pole switch 26.

Figure 4D:
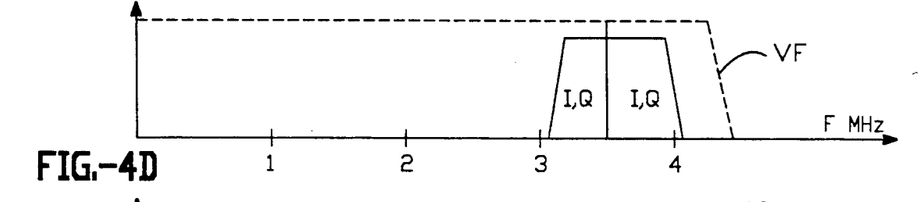

The narrow bandwidth output A' also leads to a port of a phase delayed quadrature modulator 34 which receives a 90° phase delayed color subcarrier signal on a line 36. The quadrature modulation outputs of the modulators 22 and 34 are combined together in a summing circuit 38 to provide a composite I and Q spectrum signal D (FIG. 4D). This composite narrow bandwidth modulation signal D is then delay matched in a delay match circuit 40 and sent to a summing circuit 42.

As noted, the electronic switch 26 operates sequentially, most preferably on a field by field basis in accordance with a switching control signal 27. The common node of the electronic switch 26 leads to a multiplier 44 which functions as a conventional double sideband, suppressed carrier modulator (it is not a four quadrant multiplier or quadrature modulator). The carrier signal entering the multiplier 44 is switched by a switch 45 between the zero degree phase shifted subcarrier on the line 24 for the I component and the 90 degree phase shifted subcarrier signal on the line 36 for the Q component. The electronic switch 45 is operated in synchronism with the electronic switch 26 by the control 27.

The resultant modulation envelope E put out by the multiplier 44 is then subjected to low pass filtering in a low pass filter 46. The low pass filter 46 is a fast filter with no group delay errors at 3 megahertz and with a −6 dB point at about 3.58 MHz, and with a −40 dB point at about 3.8 megahertz. The filter 46 is preferably implemented as e.g. a five pole elliptical filter.

Figures 4E, 4F:
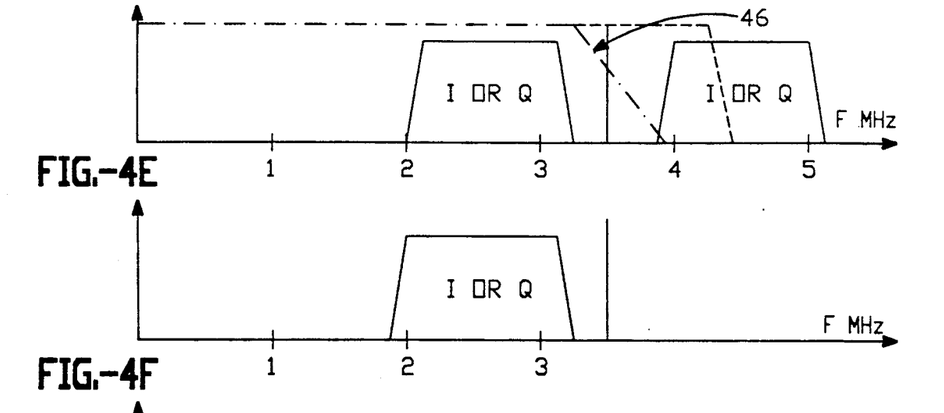

The output F of the filter 46, graphed in FIG. 4F, is added at e.g. a +6 dB level to a zero dB level output D in the summing circuit 42 in order to provide at an output 48 a full bandwidth alternating component composite color signal G as graphed in FIG. 4. FIG. 4G shows the amplitude differential between the alternating upper spectrum signals I and Q and the narrow band I and Q quadrature modulated sidebands, shown in hatching in this graph. All modulation is approximately 200 kilohertz below the rolloff of the brick wall vestigial sideband filter VF, shown in dashed lines in FIGS. 4D, 4E and 4G. The composite alternating color component baseband spectrum is then ready to be combined with baseband luminance and transmitted as upper sideband modulation of a conventional NTSC format color transmitter.

Figures 3, 5:
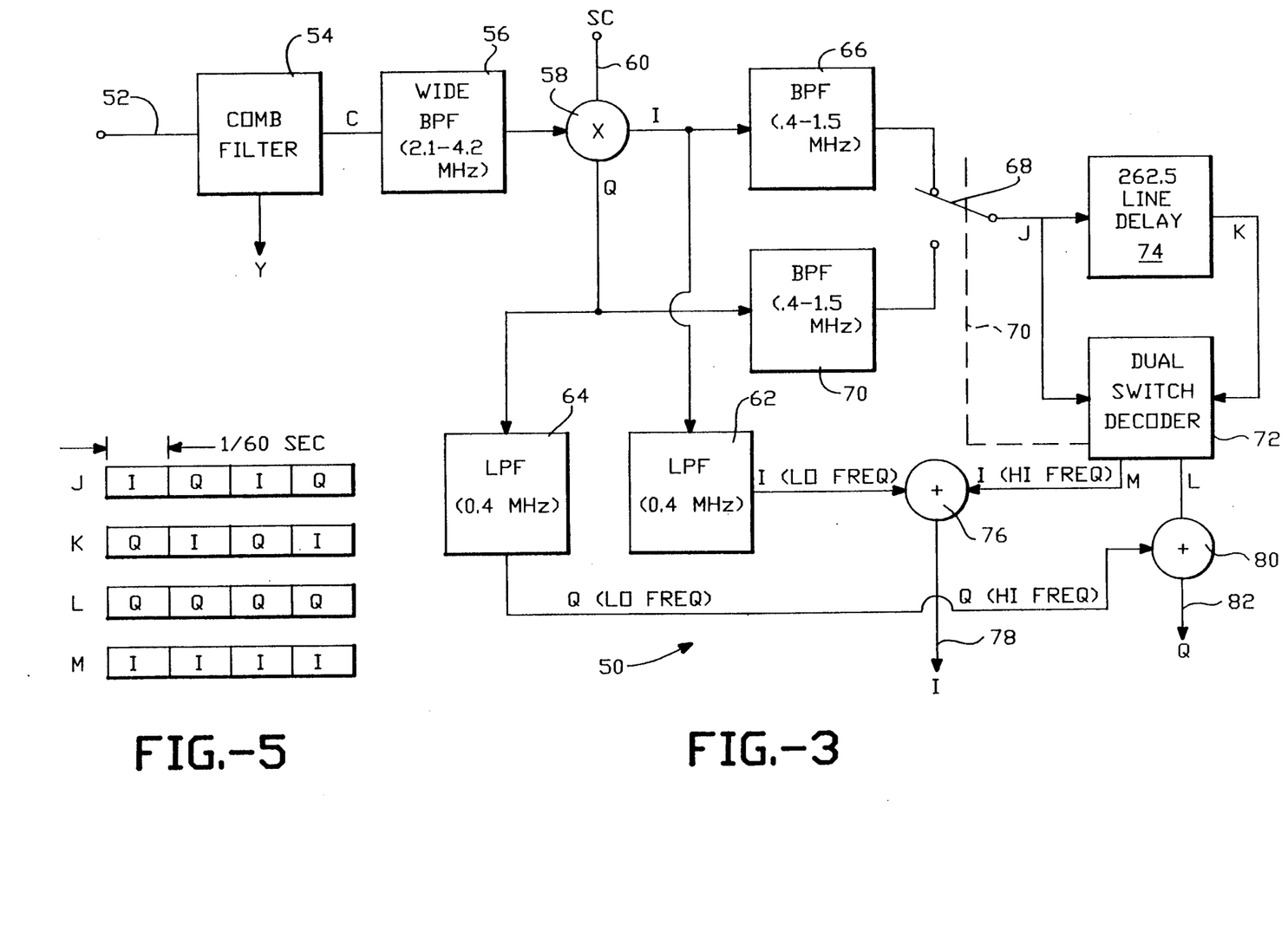
FIG. 3 is a block diagram of a chroma demodulator for decoding the modified NTSC color television signal encoded by the FIG. 2 encoder to recover full bandwidth I and Q color components.
FIG. 5 is a switching matrix graph illustrating operation of a dual switch circuit of the FIG. 3 chroma demodulator.

Turning now to FIG. 3, a decoder 50 is provided for decoding the alternating color component spectrum graphed as FIG. 6G. The decoder 50 includes an input 52 from a video detector stage (not shown) of a receiver/display. A comb filter separator 54 separates the received composite video signal into a luminance component Y and into a chroma component C. The chroma component is then passed through a bandpass pass filter having a passband of 2.1 to 4.2 MHz which limits the chroma to an effective bandwidth of 1.5 MHz on the lower side of the chroma subcarrier SC and which removes any aliases which might be present from the detection process.

The bandpass filtered output is then subjected to quadrature demodulation in a quadrature demodulator 58 which receives a color subcarrier signal SC phase locked to the color burst flag of the transmitted color signal over a line 60. The quadrature demodulator 58 puts out demodulated full bandwidth I and Q color components. The demodulated I component leads through a narrow bandpass low pass filter 62 having a cutoff at 400 kilohertz, and the demodulated Q component leads through a narrow bandpass low pass filter 64 also having a cutoff at 400 kilohertz.

The demodulated I component also passes through a bandpass filter 66 (which may be implemented by the addition of a wide bandwidth low pass filter such as the filter 18 and subtractor 20 of the encoder 10 of FIG. 2) where the demodulated and alternating upper spectrum of the I component is passed to one pole of a two pole electronic switch 68. Similarly, the demodulated Q component is passed through a bandpass filter 70 having a passband of 0.4 to 1.5 MHz, so that the demodulated and alternating upper spectrum of the Q component may be recovered and passed to the other pole of the switch 68.

As was the preferred implementation of the encoder 10, the electronic switch 68 switches between the I and Q poles at the field rate of the picture in synchronism with the encoder switch 26, by virtue of a field switching signal 70. Switching action is preferably carried out during the vertical interval of the interlaced picture.

The common node output J of the switch 68 leads through a one field and plus/minus one half line delay circuit 74. The delay 74 provides an output K having a delay of exactly 262.5 scan lines, so that the chroma information will line up precisely from field to field as it is laced back together. The undelayed alternating output J and the field-delayed alternating output K are then supplied to a dual switch decoder 72. When the undelayed output J is I, the delayed output will be Q, and vice versa.

The dual switch decoder reassembles the alternating chroma upper spectra signals I and Q into constantly present values on a 60 Hz field by field basis, as graphed in FIG. 5. Then the upper spectrum I signal is added in proper time relationship with the narrow bandwidth I component present at the output of the filter 62 in an I component adder 76 to provide a full spectrum (1.5 MHz bandwidth) I color component at an output 78. Similarly, the upper spectrum Q signal from the decoder 72 is added in proper time relationship with the narrow bandwidth Q component from the filter 64 in a Q component adder 80 in order to provide a full spectrum (1.5 MHz bandwidth) Q color component at an output 82.

The full spectrum I and Q signals on the output lines 78 and 82 then lead to a conventional color decoding matrix where increased bandwidth red, green and blue components may be decoded for display without any visible ringing on the display.

To those skilled in the art to which the present invention pertains many widely differing applications and embodiments will be suggested by the foregoing. The disclosures and descriptions herein are intended to be for the purpose of illustration only and should not be deemed as limiting the scope of the present invention as more particularly pointed out by the following claims.

What is claimed is:

1. A chroma modulation method for extending the bandwidth of a plurality of baseband chroma components of an NTSC format quadrature modulated chroma subcarrier color television signal as demodulated in an improved chroma demodulation method with reduced susceptibility to ringing and with compatibility with existing NTSC color television receivers, the chroma modulation method comprising the steps of:

separating the plurality of baseband components into narrow bandwidth segments and extended bandwidth portions not including the narrow bandwidth segments, quadrature modulating the narrow bandwidth segments into a narrow band double sideband quadrature modulation envelope about the subcarrier frequency, alternately selecting and putting out the extended bandwidth portions of the plurality of baseband components on a basis related to a predetermined scanning period of the television signal, modulating the alternately selected extended bandwidth portions at the subcarrier frequency to produce a lower single sideband, and combining in corrected time relationship the double sideband quadrature modulation envelope and the lower single sideband of the extended bandwidth portion modulation envelope to provide chroma modulation having an extended bandwidth.

2. The chroma modulation method set forth in claim 1 wherein the plurality of chroma components comprise I and Q chroma components.

3. The chroma modulation method set forth in claim 1 wherein the plurality of chroma components comprise red minus luminance (R-Y) and blue minus luminance (B-Y) components.

4. The chroma modulation method set forth in claim 1 wherein the step of modulating the alternately selected extended bandwidth portions at the subcarrier frequency to produce a lower single sideband includes the step of low pass filtering the upper sideband of the extended bandwidth portion in order to limit it to an upper frequency not substantially greater than the upper frequency limit of the double sideband quadrature modulation envelope.

5. The chroma modulation method set forth in claim 1 wherein the double sideband quadrature modulation envelope is limited to approximately plus and minus 400 kilohertz about the chroma subcarrier, and wherein the low pass filtered extended bandwidth portion modulation envelope extends from approximately minus 400 kilohertz to minus 1500 kilhertz below the the chroma subcarrier.

6. The chroma modulation method set forth in claim 1 wherein the predetermined scanning period of the television signal is selected to be the field period.

7. The chroma modulation method set forth in claim 1 wherein the compatible chroma demodulating method at a display for demodulating the chroma modulation comprises the steps of:

separating the chroma modulation passband from a received composite video signal, quadrature demodulating the separated chroma modulation passband into a received I component and a received Q component, low pass filtering the received I component into a narrow bandwidth I segment, low pass filtering the received Q component into a narrow bandwidth Q segment, bandpass filtering the received I component into an extended bandwidth I portion, bandpass filtering the received Q component into an extended bandwidth Q portion, alternately selecting and putting out the extended bandwidth I portion and the extended bandwidth Q portion on the said basis related to a predetermined scanning period of the television signal to provide a selected portion, passing the selected portions through a delay corresponding in period to the predetermined scanning period to provide a delayed portion, combining the selected portion and the delayed portion in a decoder means to recover for each predetermined scanning period an extended bandwidth I portion and an extended bandwidth Q portion, adding in proper time relationship the narrow bandwidth I segment and the extended bandwidth I portion to provide a received full bandwidth I component, adding in proper time relationship the narrow bandwidth Q segment and the extended bandwidth Q portion to provide a received full bandwidth Q component, and decoding the extended bandwidth I component and the extended bandwidth Q component with the received luminance into red, green and blue video signals for presentation on a display screen of the display.

8. A method for demodulating an extended chroma bandwidth NTSC format quadrature modulated chroma subcarrier color television signal in which a plurality of chroma components have been modulated in accordance with the steps of separating the plurality of baseband chroma components into narrow bandwidth segments and extended bandwidth portions not including the narrow bandwidth segments; quadrature modulating the narrow bandwidth segments into a narrow band double sideband quadrature modulation envelope about the subcarrier frequency; alternately selecting and putting out the extended bandwidth portions of the plurality of components on a basis related to a predetermined scanning period of the television signal; modulating the alternately selected extended bandwidth portions at the subcarrier frequency to produce a lower single sideband; and, combining in corrected time relationship the double sideband quadrature modulation envelope and the lower single sideband of the extended bandwidth portion modulation envelope to provide the chroma modulation having an extended bandwidth; the demodulating method comprising at a display the steps of:

separating the chroma modulation passband from a received composite video signal, quadrature demodulating the separated chroma modulation passband into a received first chroma component and a received second chroma component, low pass filtering the received first chroma component into a narrow bandwidth segment, low pass filtering the received second chroma component into a narrow bandwidth segment, bandpass filtering the received first chroma component into an extended bandwidth first portion, bandpass filtering the received second component into an extended bandwidth second portion, alternately selecting and putting out the extended bandwidth first portion and the extended bandwidth second portion on the said basis related to a predetermined scanning period of the television signal to provide a selected portion, passing the selected portions through a delay corresponding in period to the predetermined scanning period to provide a delayed portion, combining the selected portion and the delayed portion in a decoder means to recover for each predetermined scanning period an extended bandwidth first portion and an extended bandwidth second portion, adding in proper time relationship the narrow bandwidth first segment and the extended bandwidth first portion to provide a received full bandwidth first component, adding in proper time relationship the narrow bandwidth second segment and the extended bandwidth second portion to provide a received full bandwidth second component, and decoding the extended bandwidth first component and the extended bandwidth second component with the received luminance into red, green and blue video signals for presentation on a display screen of the display.

9. The demodulating method set forth in claim 8 wherein the plurality of baseband chroma components comprise I and Q components.

10. The demodulating method set forth in claim 8 wherein the plurality of baseband chroma components comprise red minus luminance (R-Y) and blue minus luminance (B-Y) components.

11. The demodulating method set forth in claim 8 wherein the double sideband quadrature modulation envelope is limited to approximately plus and minus 400 kilohertz about the chroma subcarrier, and wherein the low pass filtered extended bandwidth portion modulation envelope extends from approximately minus 400 kilohertz to minus 1500 kilhertz below the the chroma subcarrier.

12. The demodulating method set forth in claim 8 wherein the predetermined scanning period of the television signal is selected to be the field period.

* * * * *

UNITED STATES PATENT AND TRADEMARK OFFICE
CERTIFICATE OF CORRECTION

PATENT NO. : 5,081,521

DATED : January 14, 1992

INVENTOR(S) : Yves C. Faroudja

Figure 4G:
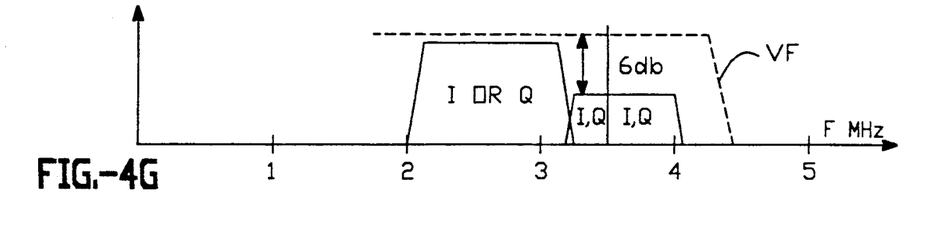

It is certified that error appears in the above-identified patent and that said Letters Patent is hereby corrected as shown below:

Column 01
  Line 19 -- delete "o" after "Q"
Column 01
  Line 35 -- "The" should be --the--
Column 01
  Line 36 -- "The" should be --the--
Column 03
  Line 45 -- "kilhertz" should be --kilohertz
Column 06
  Line 17 -- "liklihood" should be --likelihood--
Column 06
  Line 51 -- "noarrow" should be --narrow--
Column 07
  Line 42 -- "Fig. 4" should be --Fig. 4G--
Column 07
  Line 56 -- "Fig. 6G" should be --Fig 4G--
Column 09
  Line 47 -- "kilhertz" should be --kilohertz--
Column 12
  Line 16 -- "kilhertz" should be --kilohertz--

Signed and Sealed this

Fourteenth Day of September, 1993

*Attest:*

BRUCE LEHMAN

*Attesting Officer*     *Commissioner of Patents and Trademarks*